(12) United States Patent
Nelson

(10) Patent No.: US 9,284,839 B2
(45) Date of Patent: Mar. 15, 2016

(54) SIDE-MOUNTED BOLT DRIVER AND METHOD OF DRIVING ROCK BOLTS

(71) Applicant: Yves Nelson, Ontario (CA)

(72) Inventor: Yves Nelson, Ontario (CA)

(73) Assignee: 1311854 ONTARIO LIMITED, Ontario (CA)

( * ) Notice: Subject to any disclaimer, the term of this patent is extended or adjusted under 35 U.S.C. 154(b) by 42 days.

(21) Appl. No.: 14/253,562

(22) Filed: Apr. 15, 2014

(65) Prior Publication Data

US 2015/0292326 A1 Oct. 15, 2015

(30) Foreign Application Priority Data

Apr. 15, 2014 (CA) ...................................... 2848901

(51) Int. Cl.
*E21D 20/00* (2006.01)
*E21D 21/00* (2006.01)
*B23Q 3/18* (2006.01)

(52) U.S. Cl.
CPC ............... *E21D 20/003* (2013.01); *B23Q 3/18* (2013.01); *E21D 21/00* (2013.01)

(58) Field of Classification Search
CPC .............................. E21D 20/00; E21D 20/003
USPC ............................................ 405/259.1–259.6
See application file for complete search history.

(56) References Cited

U.S. PATENT DOCUMENTS

| | | | | | |
|---|---|---|---|---|---|
| 4,226,559 | A | * | 10/1980 | Prebensen ...................... | 405/303 |
| 5,114,279 | A | * | 5/1992 | Bjerngren et al. ............. | 405/303 |
| 6,135,674 | A | * | 10/2000 | Neilson ....................... | 405/259.1 |
| 6,598,309 | B1 | * | 7/2003 | Coombs .......................... | 33/644 |
| 6,814,155 | B1 | * | 11/2004 | Nielson et al. ................. | 173/152 |
| 7,607,866 | B2 | * | 10/2009 | Eddowes et al. ............ | 405/259.1 |
| 2003/0066665 | A1 | * | 4/2003 | Coombs et al. ................. | 173/32 |
| 2004/0118578 | A1 | * | 6/2004 | O'Meley ........................ | 173/152 |
| 2005/0129466 | A1 | * | 6/2005 | Walker et al. .............. | 405/259.1 |
| 2010/0266346 | A1 | * | 10/2010 | Eddowes et al. ............ | 405/259.1 |
| 2014/0112724 | A1 | * | 4/2014 | Nelson ........................ | 405/259.1 |

FOREIGN PATENT DOCUMENTS

WO WO 2013127409 A1 * 9/2013

* cited by examiner

*Primary Examiner* — Benjamin Fiorello
(74) *Attorney, Agent, or Firm* — Allen J. Moss; Squire Patton Boggs (US) LLP

(57) ABSTRACT

A rock drilling and bolting system comprises a drill feed slidable on a drill feed rail for drilling a hole, a bolter feed slidable on a bolter feed rail, the bolter feed having a main bolt driver for driving a rock bolt, a side-mounted bolt driver mounted to the bolter feed rail, the side-mounted bolt driver being disposed rearwardly of the main bolt driver to receive the rock bolt when there is insufficient space to load the rock bolt in the main bolt driver and to drive the rock bolt partially into the hole, and an indexing mechanism for rotating the main bolt driver into alignment with the rock bolt that is partially driven into the hole, wherein the main bolt driver drives the rock bolt fully into the hole.

17 Claims, 11 Drawing Sheets

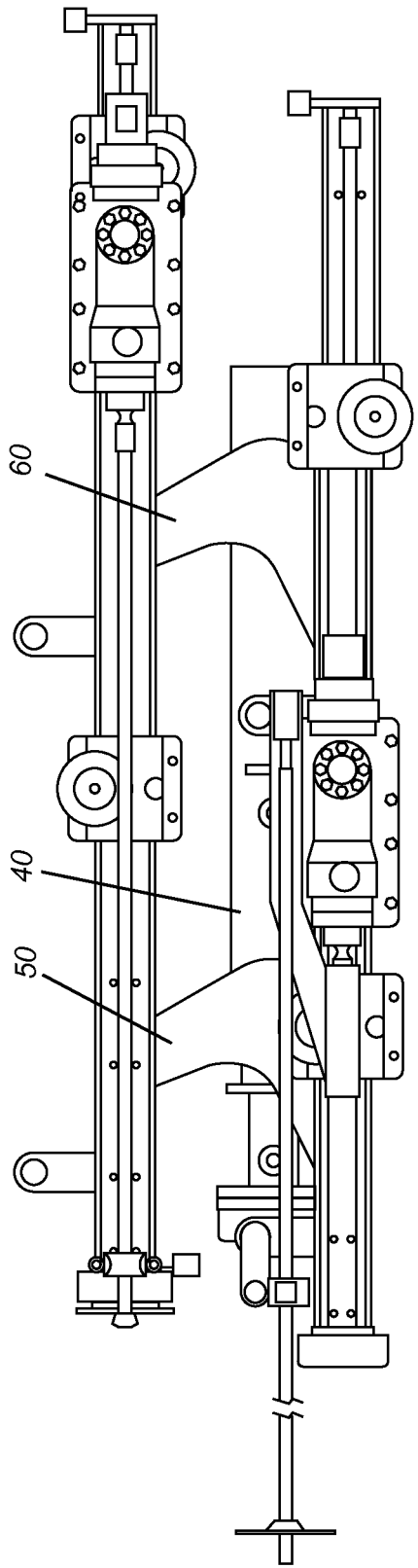
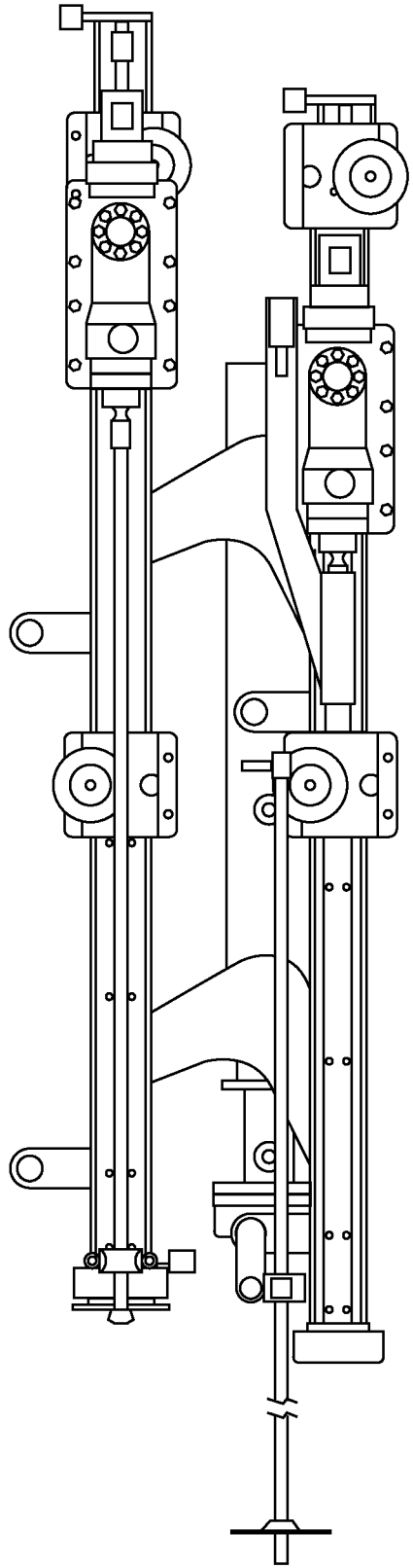
FIG. 5                    FIG. 6

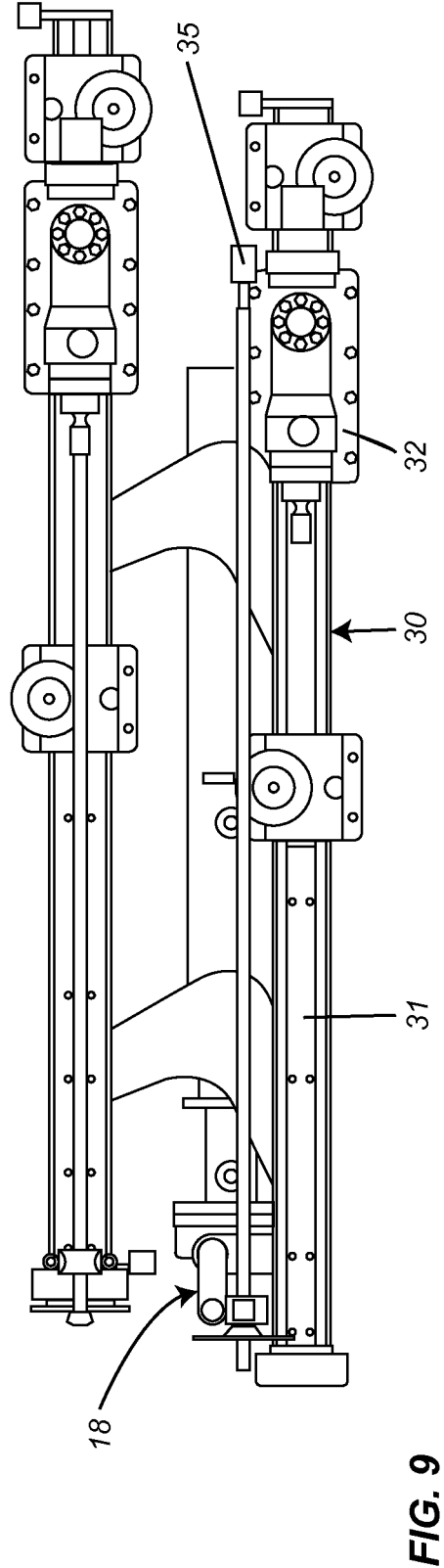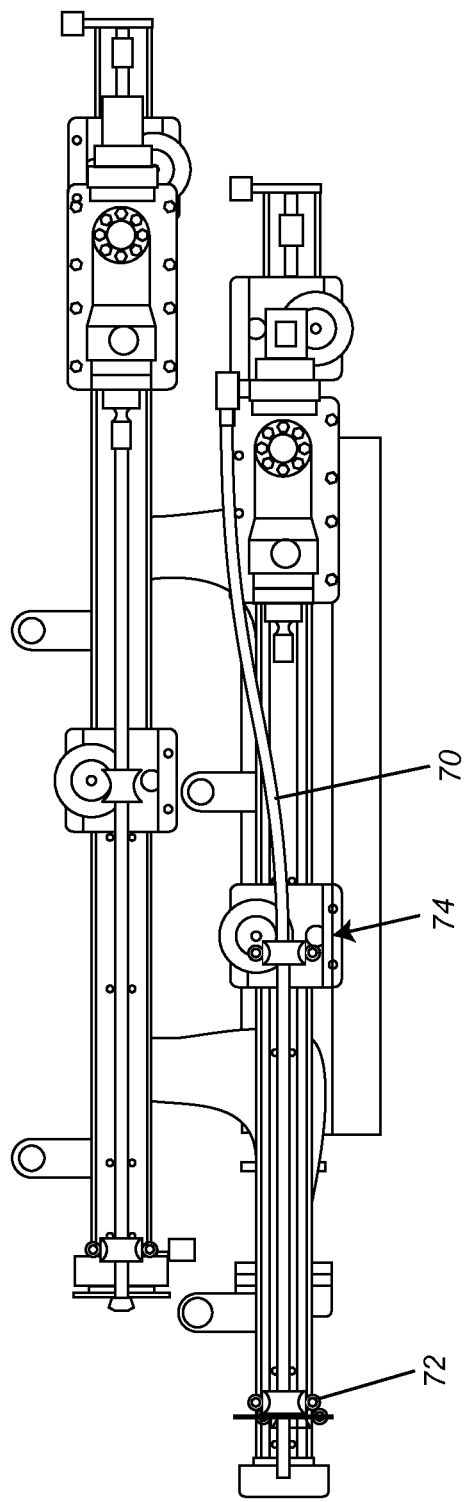
FIG. 9
FIG. 10

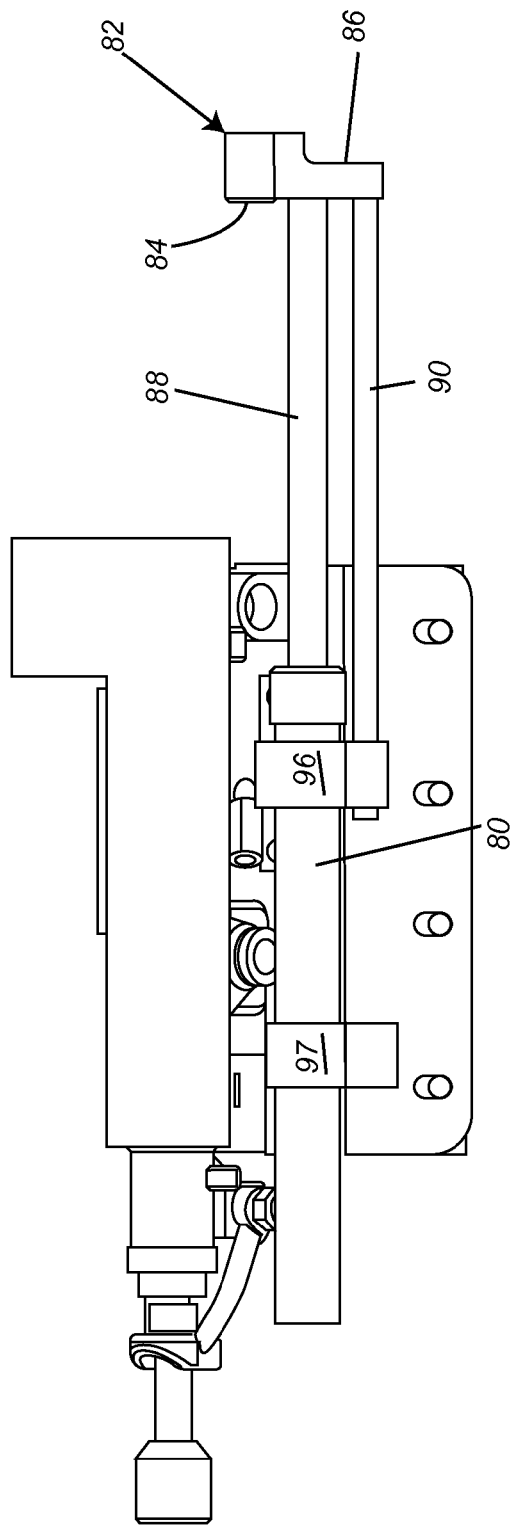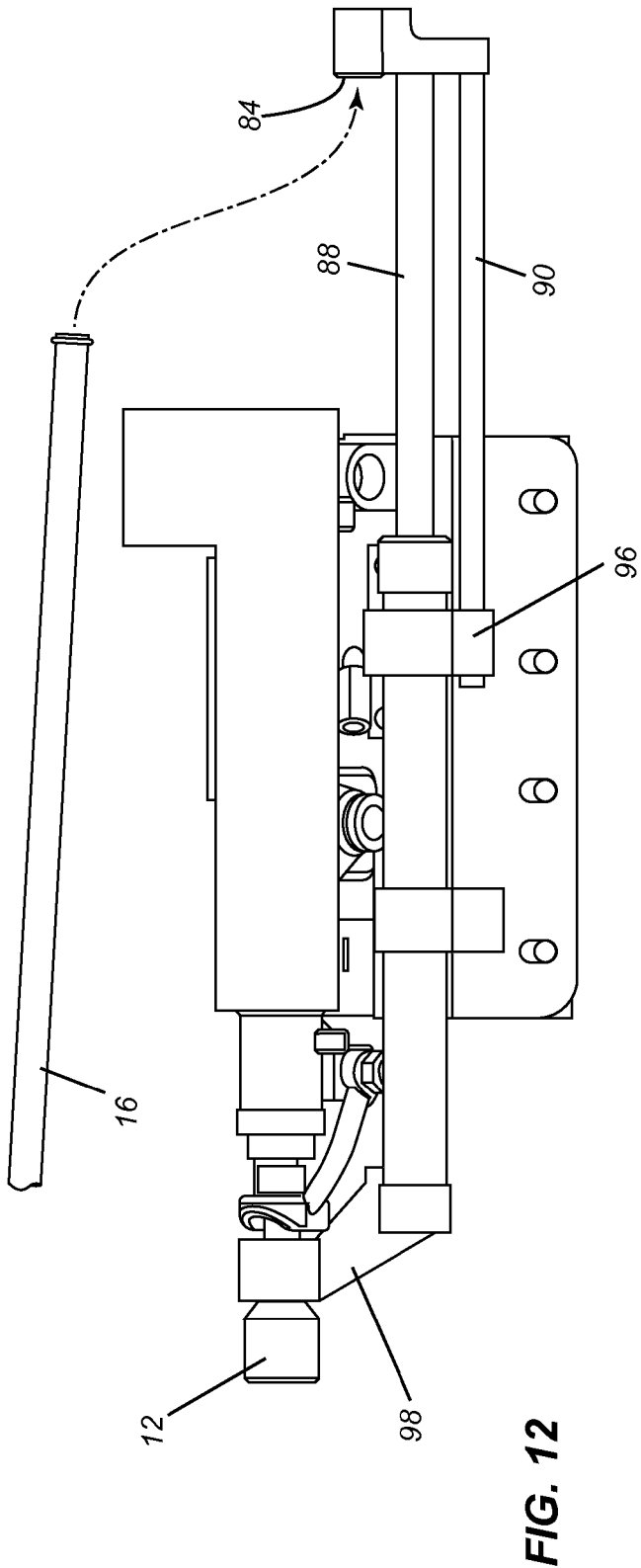
FIG. 11
FIG. 12

SIDE-MOUNTED BOLT DRIVER AND METHOD OF DRIVING ROCK BOLTS

CROSS-REFERENCE TO RELATED APPLICATIONS

This application claims the benefit of priority from Canadian Patent Application Serial No. 2,848,901 filed in the name of Yves Nelson on Apr. 15, 2014, and entitled "Side-Mounted Bolt Driver and Method of Driving Rock Bolts," the contents of which are incorporated by reference.

TECHNICAL FIELD

The present invention relates generally to mining equipment and, in particular, to rock drilling and rock bolting.

BACKGROUND

In a mine, ground support, e.g. rock bolts and screening, is used to prevent rock falls. Several different types of rock bolts may be used but all require that holes be drilled in the rock first. This is done with equipment known as rock bolters. These are mobile units with a bolting head attached. To drill a hole in the rock to install ground support, the bolting head is placed against the rock face (which is called "stinging the face") and then a hole is drilled into the rock. The unit is then indexed to install the rock bolt as ground support.

Conventionally, the step of indexing from the drill to the bolter is problematic since it may result in misalignment of the bolter relative to the drilled hole. Conventionally, the drill feed must be retracted (by moving a feed extension cylinder or boom) to remove the drill feed from the rough uneven rock face before indexing. Ground support operations can become inefficient, time-consuming and expensive when misalignment occurs.

In an underground mine, a drift may be narrow. In a narrow drift, it may be necessary to install rock bolts which are too long to fit directly into the rock bolter or bolt driver. In these cases, the miner must install the rock bolt by hand far enough into the hole to allow the rock bolt to be connected to the drive head which is difficult and time-consuming.

A need therefore exists for an effective solution to this technical problem.

SUMMARY

In broad terms, the present invention provides a novel side-mounted rock bolt driver and method that enables insertion of rock bolts in tight spaces.

The present invention allows full mechanical insertion. First the miner installs the bolt onto a novel side-mounted bolt driver. Then the miner pushes the bolt far enough into the hole to allow sufficient clearance so the rock drill can finish pushing the bolt the rest of the way. The side-mounted bolt driver is connected to the striking bar of the rock drill when impact is required to insert the rock bolt for example when using split set bolt. The driver could also be directly mounted to the drill cradle or hose drum cradle when impact is not required for example when installing mechanical type bolts. When installing bolts which need to be held in place when installing in the roof a swing centralizer could be used to hold the bolt in place while the feeds are indexing or moving into place. It is also possible to flex the bolt past the rock drill then reverse the rock drill to allow clearance then advance again. Again centralizers are used to stabilize the rock bolt.

In general, disclosed herein is a rock drilling and bolting system that has a side-mounted bolt driver that is spaced rearwardly of a main bolt driver. The side-mounted bolt driver is designed to drive a rock bolt partly into a hole that has been drilled. The main bolt driver is rotated into alignment with the partially inserted rock bolt to complete the insertion of the rock bolt into the hole.

Accordingly, one inventive aspect of the present disclosure is a rock drilling and bolting system. This system includes a frame supporting a movable drill feed rail and a movable bolter feed rail, a drill feed slidable on the drill feed rail for drilling a hole, a bolter feed slidable on the bolter feed rail, the bolter feed having a main bolt driver for driving a rock bolt, a side-mounted bolt driver mounted to the bolter feed, the side-mounted bolt driver being disposed rearwardly of the main bolt driver to receive the rock bolt when there is insufficient space to load the rock bolt in the main bolt driver and to drive the rock bolt partially into the hole, and an indexing mechanism for rotating the main bolt driver into alignment with the rock bolt that is partially driven into the hole, wherein the main bolt driver drives the rock bolt fully into the hole.

Another inventive aspect of the present disclosure is a method of installing ground support using a rock drilling and bolting system having a drill feed rail and a bolter feed rail. The method entails drilling a hole in a rock, retracting the drill feed rail while advancing the bolter feed rail to position the system in a bolt-loading position, loading a rock bolt into a side-mounted bolt driver that is spaced further rearward from the rock than a main bolt driver, driving the rock bolt partially into the hole using the side-mounted bolt driver, indexing the main bolt driver into alignment with the rock bolt, and driving the rock bolt fully into the hole using the main bolt driver.

Yet another inventive aspect of the present disclosure is a rock drilling and bolting system having a frame supporting a movable drill feed rail and a movable bolter feed rail that are connected together via first and second L-shaped pivot arms such that the drill feed rail and bolter feed rail rotate together relative to the frame, a drill feed slidable on the drill feed rail for drilling a hole in a rock, a bolter feed slidable on the bolter feed rail, the bolter feed having a main bolt driver for driving a rock bolt, a side-mounted bolt driver mounted to the bolter feed, the side-mounted bolt driver being disposed rearwardly of the main bolt driver such that the side-mounted bolt driver is further from the rock than the main bolt driver, and an indexing mechanism for rotating the main bolt driver into alignment with the rock bolt after the side-mounted bolt driver has partially driven the rock bolt into the hole, wherein the bolter feed causes the main bolt driver to drive the rock bolt completely into the hole.

This summary is provided to highlight certain significant inventive aspects but is not intended to be an exhaustive or limiting definition of all inventive aspects of the disclosure. Other inventive aspects may be disclosed in the detailed description and drawings.

BRIEF DESCRIPTION OF THE DRAWINGS

Further features and advantages of the present invention will become apparent from the following detailed description, taken in combination with the appended drawings, in which:

FIG. 5 is a top view of the drilling and bolting system showing the bolt partially driven into the hole by the side-mounted bolt driver;

FIG. 6 is a top view of the drilling and bolting system after the drill has returned;

FIG. 9 is a top view of a system having a drill cradle mounted bolt driver in accordance with a second embodiment;

FIG. 10 is a top view of a system having a rock bolt flexed off center;

FIG. 11 is a side view of an adjustable drill-cradle mounted bolt driver in accordance with a fourth embodiment.

FIG. 12 is another side view of the bolt driver;

It will be noted that throughout the appended drawings, like features are identified by like reference numerals. It should furthermore be noted that the drawings are not necessarily to scale.

DETAILED DESCRIPTION

Figure 1:
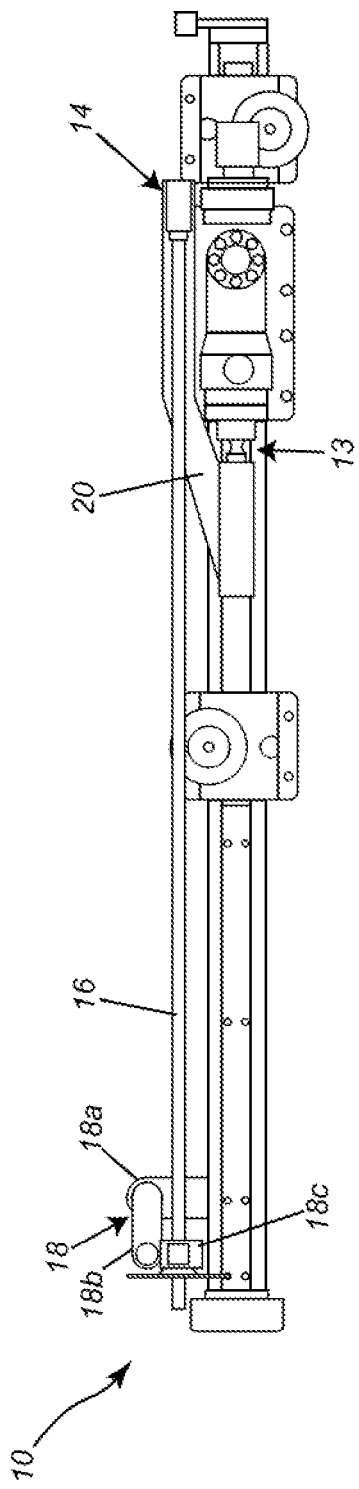
FIG. 1 is a top view of a bolter feed having a side-mounted bolt driver in accordance with a first embodiment of the present invention.
Figure 2:
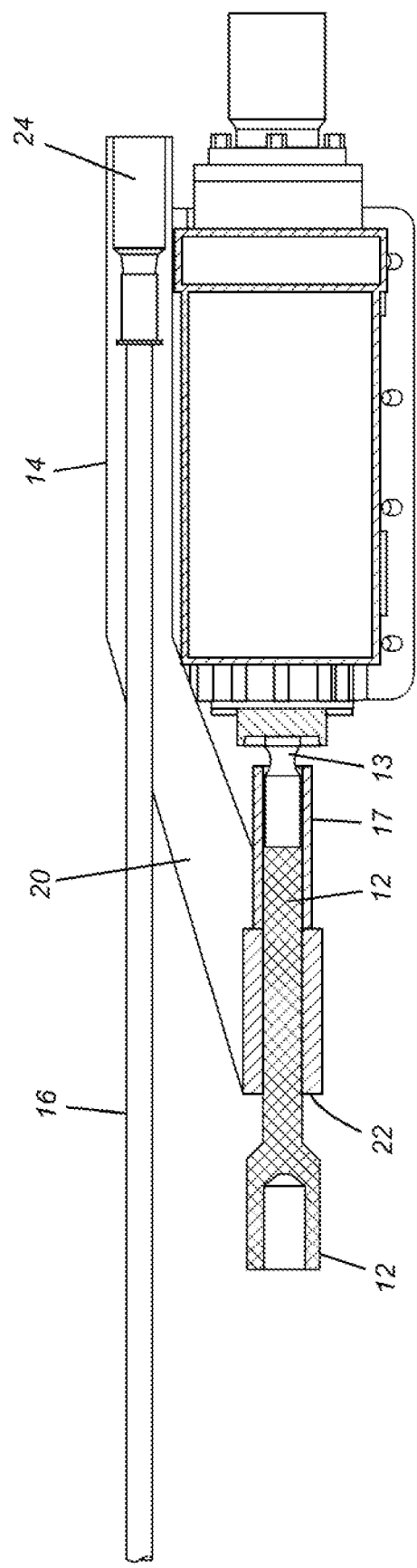
FIG. 2 is a cross-sectional view of the bolter feed and side-mounted bolt driver of FIG. 1.

FIGS. 1-2 depict a bolter feed 10 that includes both a main bolt driver 12 and a side-mounted bolt driver 14 in accordance with an embodiment of the present invention. The side-mounted bolt driver is disposed rearwardly of the main bolt driver to provide more room to load a rock bolt 16. The side-mounted bolt driver drives the rock bolt partly into the hole. The main bolt driver drives the partly inserted rock bolt the rest of the way into the hole. A swing arm centralizer 18 guides (centralizes) the rock bolt, as will be described in greater detail below.

FIGS. 3-8 depict a complete drilling and bolting system 100 that includes the bolter feed 10 (with main and side-mounted bolt drivers) depicted in FIGS. 1-2 as well as a drill feed 30. The rock drilling and bolting system includes a frame 40 supporting a movable drill feed rail and a movable bolter feed rail, a drill feed slidable on the drill feed rail for drilling a hole, a bolter feed slidable on the bolter feed rail, the bolter feed having a main bolt driver for driving a rock bolt, a side-mounted bolt driver mounted to the bolter feed, the side-mounted bolt driver being disposed rearwardly of the main bolt driver to receive the rock bolt when there is insufficient space to load the rock bolt in the main bolt driver and to drive the rock bolt partially into the hole and an indexing mechanism for rotating the main bolt driver into alignment with the rock bolt that is partially driven into the hole, wherein the main bolt driver drives the rock bolt fully into the hole.

As depicted in FIG. 2, the side-mounted bolt driver 14 has an attachment collar 22 for attaching to the main bolt driver 12 such that a striking bar 13 percussively transmits forces to the side-mounted bolt driver. The side-mounted bolt driver also has an angled arm (or side arm) 20 extending rearwardly and outwardly from the collar. The side-mounted bolt driver includes a rear socket 24 parallel to the main bolt driver for receiving a rear end of the rock bolt, the socket extending rearwardly from the angled arm.

As further depicted in FIG. 2, the attachment collar of the side-mounted bolt driver abuts, and receives percussive forces from, a connecting collar 17 (or sleeve) that connects the main bolt driver 12 to the striking bar 13. The main bolter drive may be a standard bolt driver or a Swellex tool.

As introduced in FIG. 1, the system further includes a swing arm centralizer 18 adapted to pivot when the indexing mechanism rotates the main bolt driver into alignment with the rock bolt (as shown in FIGS. 3-8). In the particular embodiment illustrated in these figures, the swing arm centralizer includes a first arm 18a mounted to the bolter feed rail, a second arm 18b pivotally connected to the first arm, and a third arm 18c pivotally connected to the second arm, the third arm comprising a passageway for slidably receiving and centralizing the rock bolt.

As shown in FIGS. 3-8, the system further includes a first L-shaped pivot arm 50 pivotally connecting the drill feed rail and the bolter feed rail, and a second L-shaped pivot arm 60 pivotally connecting the drill feed rail and the bolter feed rail. The bolter feed rail is thus rotationally coupled to the drill feed rail by the first and second pivot L-shaped pivot arms 50, 60 to enable the drill feed rail and the bolter feed rail to rotate in unison between a drilling position and a bolting position.

As depicted in FIGS. 3-8, the rock drilling and bolting system includes a frame which may be mounted or otherwise secured to the rock bolter or which may be an existing part of the rock bolter. As depicted in FIGS. 3-8, the system includes a drill feed rail. The system also includes a bolter feed rail. The bolter feed rail is parallel to the drill feed rail. Note that the bolter feed rail always remains parallel to the drill feed rail throughout its full range of motion. The system may include an actuator for rotating the drill feed rail and the bolter feed rail. The bolter feed rail is rotationally coupled to the drill feed rail by the first and second pivot L-shaped pivot arms to enable the drill feed rail and the bolter feed rail to rotate in unison between a drilling position in which the drill feed rail is aligned with a drilled hole and a bolting position in which the bolter feed rail is aligned with the drilled hole.

The drill feed rail supports a movable (i.e. slidable) drill feed on a drill feed carriage. The bolter feed rail supports a movable (i.e. slidable) bolter feed on a bolter feed carriage. The main bolt driver has a socket or holder for receiving a rear end of the rock bolt and thus to drive the rock bolt forward when the bolter feed advances. The bolter feed is mounted to the carriage via a support member.

As further depicted in FIGS. 3-8, the system includes a drill feed for feeding a drill string by sliding over the drill feed rail. The system includes a bolter feed for feeding a rock bolt by sliding over the bolter feed rail.

Figure 3:
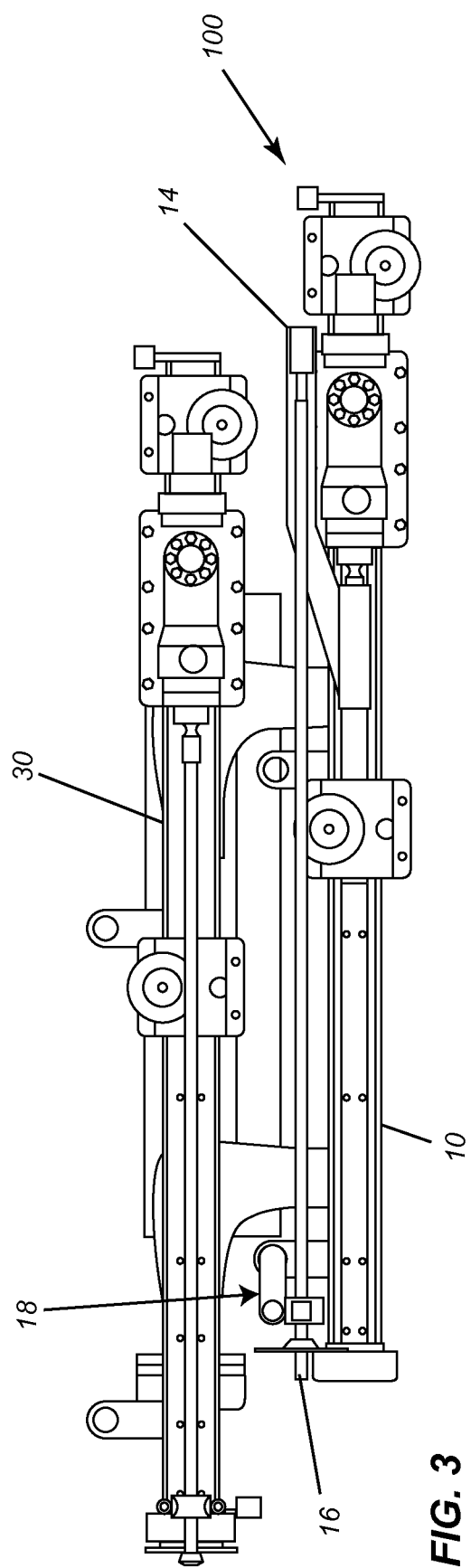
FIG. 3 is a top view of the drilling and bolting system in a drilling position.
Figure 4:
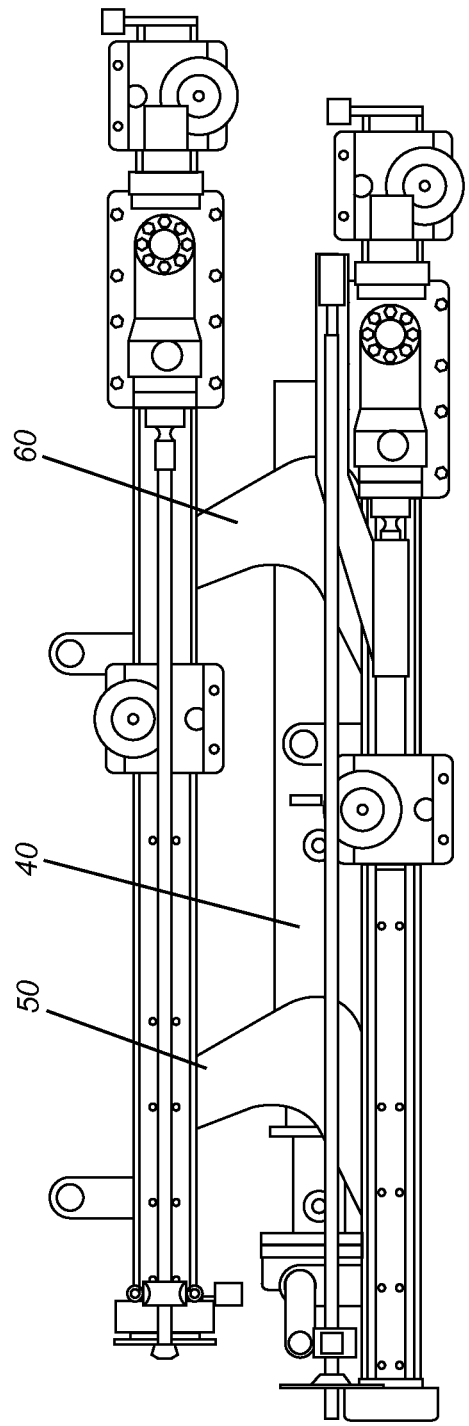
FIG. 4 is a top view of the drilling and bolting system in a bolt-loading position.

The system depicted in FIGS. 3-8 also enables a method of installing ground support. The method entails a step of positioning the drill feed rail facing a rock face of a rock (or rock formation) that is to be drilled and bolted (i.e. into which ground support is to be inserted). FIG. 3 is a top view of the drilling and bolting system in a drilling position, ready to drill a hole in the rock. Once the drill feed rail is properly positioned and aligned with the rock, the drill feed is advanced to drill the hole in the rock. Once the hole has been drilled, the drill feed is retracted from the hole. In places where there is insufficient room to load a rock bolt, the side-mounted bolt driver is used to partly insert the rock bolt into the hole. FIG.

Figure 7:
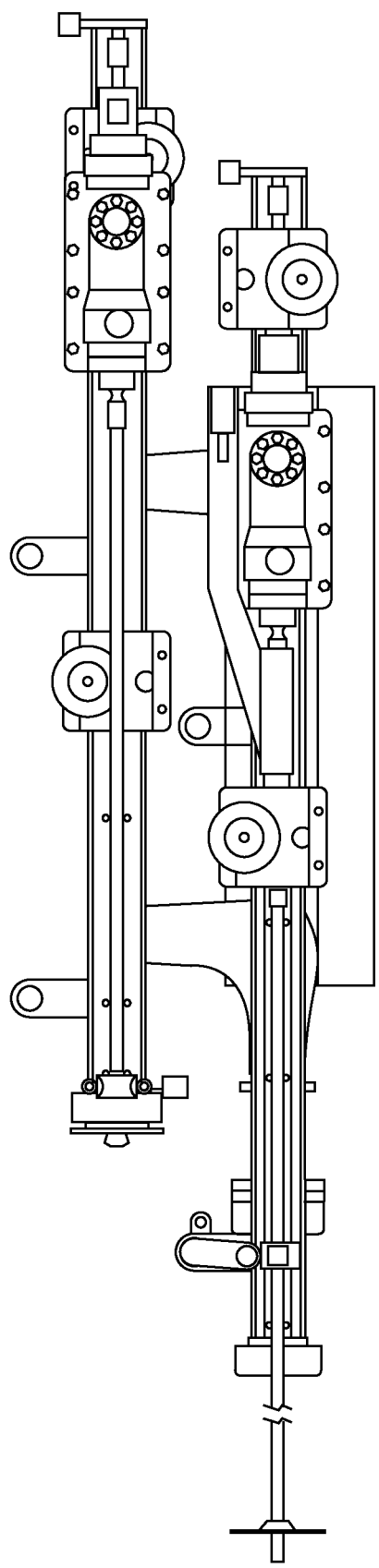
FIG. 7 is a top view of the drilling and bolting system after indexing into the bolting position.
Figure 8:
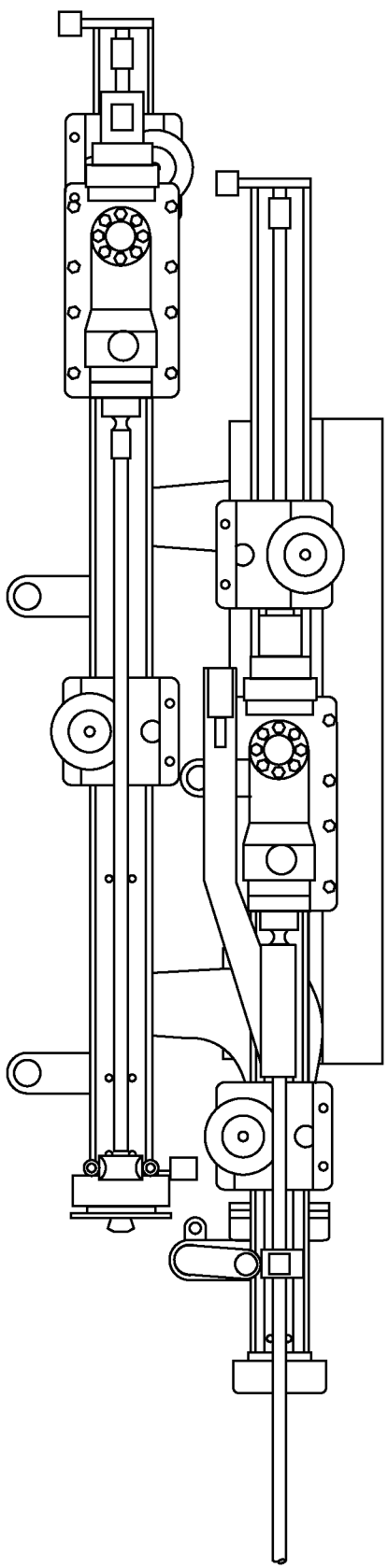
FIG. 8 is a top view of the drilling and bolting system after the bolt has been driven into the hole.

4 is a top view of the drilling and bolting system in a bolt-loading position. In this position, the rock bolt is loaded into the side-mounted bolt driver. The rock bolt is then partially driven into the hole. FIG. 5 is a top view of the drilling and bolting system showing the bolt partially driven into the hole by the side-mounted bolt driver. FIG. 6 is a top view of the drilling and bolting system after the drill has returned. To complete the insertion of the rock bolt, the main bolt driver is then utilized (as the side-mounted bolt driver cannot extend forward enough to completely drive the rock bolt into the hole). Accordingly, the insertion of the rock bolt is completed by the main bolt driver. However, the main bolt driver is not aligned with the side-mounted bolt driver (i.e. they are parallel to one another). Therefore, it is necessary to index (or rotate) the main bolt driver into alignment with the rock bolt so that the main bolt driver can drive the rock bolt into the hole. FIG. 7 is a top view of the drilling and bolting system after indexing into the bolting position. Once this indexing is complete, the main bolt driver percussively drives or hammers the bolt into the hole. FIG. 8 is a top view of the drilling and bolting system after the bolt has been driven into the hole. As will be appreciated from the foregoing description, this side-mounted bolt driver enables rock bolts to be loaded and inserted into a hole in a tight space where it would otherwise be impossible to load the rock bolt onto the main bolt driver. This method thus provides a two-step bolting procedure in which the side-mounted bolt driver performs the initial step of partly driving the bolt into the hole and the main bolt driver performs the second (and final) step of driving the bolt into the hole. The indexing mechanism enables the main bolt driver to be rotated accurately into alignment with the rock bolt while concurrently rotating the side-mounted bolt driver out of alignment with the partially installed rock bolt.

FIG. 9 is a top view of a system having a drill-cradle mounted bolt driver in accordance with a second embodiment. As depicted by way of example in FIG. 9, the drill feed 30 (which rides on drill feed rail 31) has a drill cradle 32 (or sliding carriage) to which the drill-cradle mounted bolt driver 35 is mounted. The system of FIG. 9 includes a swing-arm centralizer 18.

FIG. 10 is a top view of a system having a flexible rock bolt 70 flexed off center in accordance with a third embodiment. As depicted by way of example in FIG. 10, the system has a first centralizer 72 and a second centralizer 74 (instead of a swing-arm centralizer).

FIGS. 11 and 12 are side views of an adjustable drill-cradle mounted bolt driver in accordance with a fourth embodiment. The bolt driver includes a fixed cylinder or other equivalent impact device 80. The cylinder (impact device) 80 has first and second extension rods 88, 90 to adjust a position of the bolt holder 82. The holder 82 has a socket 84 for receiving the rear end of the rock bolt and a rear L-shaped member 86 which support the socket 84 and connects to the rods 88, 90.

The cylinder or impact device 80 is supported by one or two guide supports 96, 97. Specifically, in FIG. 11, there are two guide supports 96, 97. In FIG. 12, there is one guide support 96 but also a forward arm 98 to support a forward end of the impact device on the main bolter driver 12.

Figure 13:
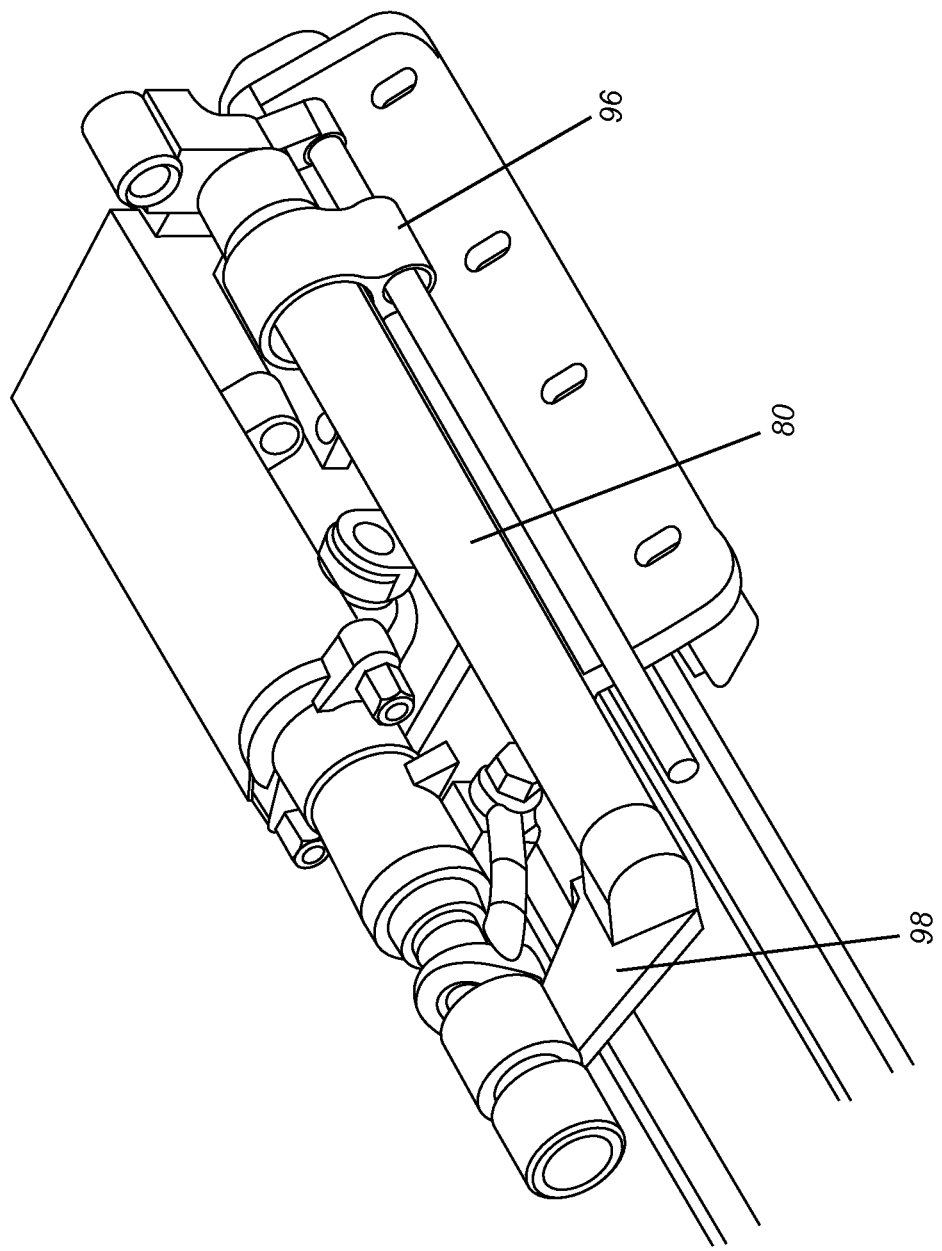
FIG. 13 is a front perspective view of the bolt driver in its retracted posture.
Figure 14:
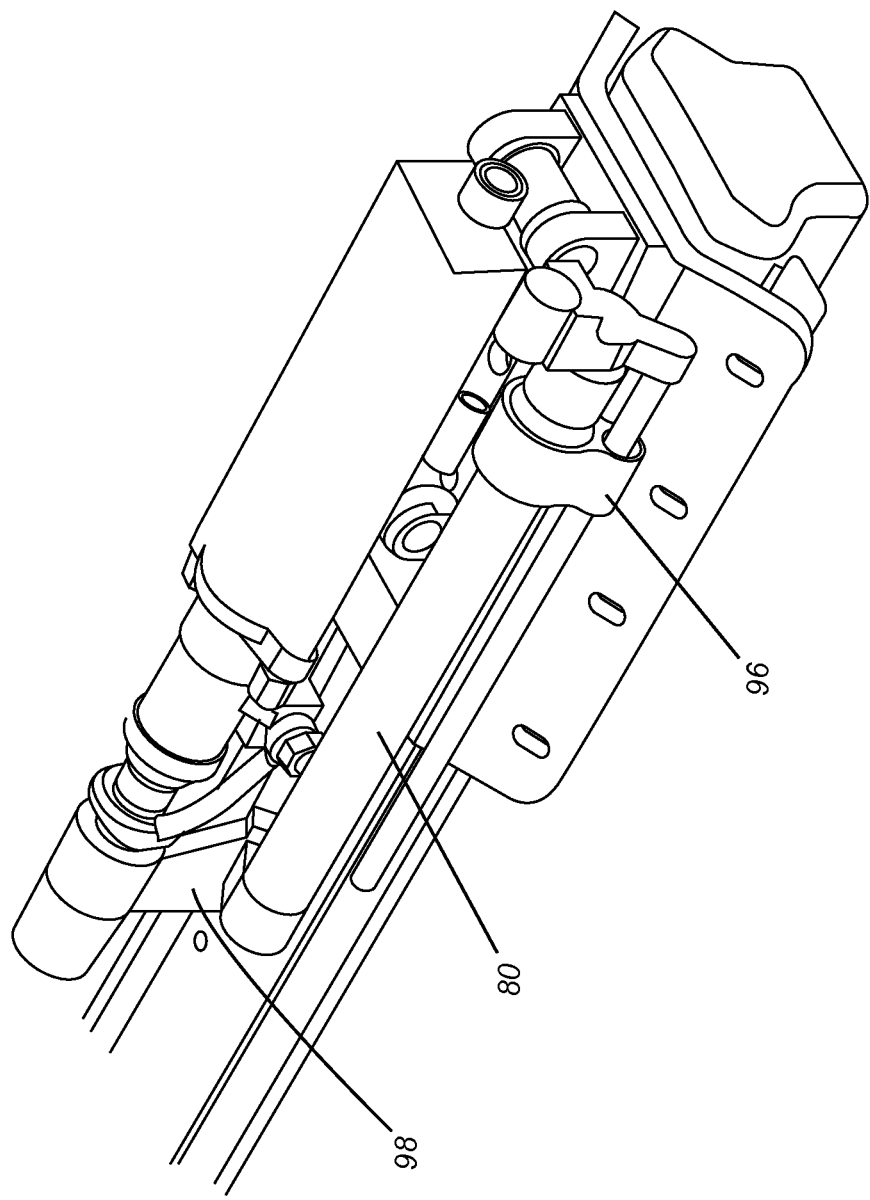
FIG. 14 is a rear perspective view of the bolt driver in its retracted posture.
Figure 15:
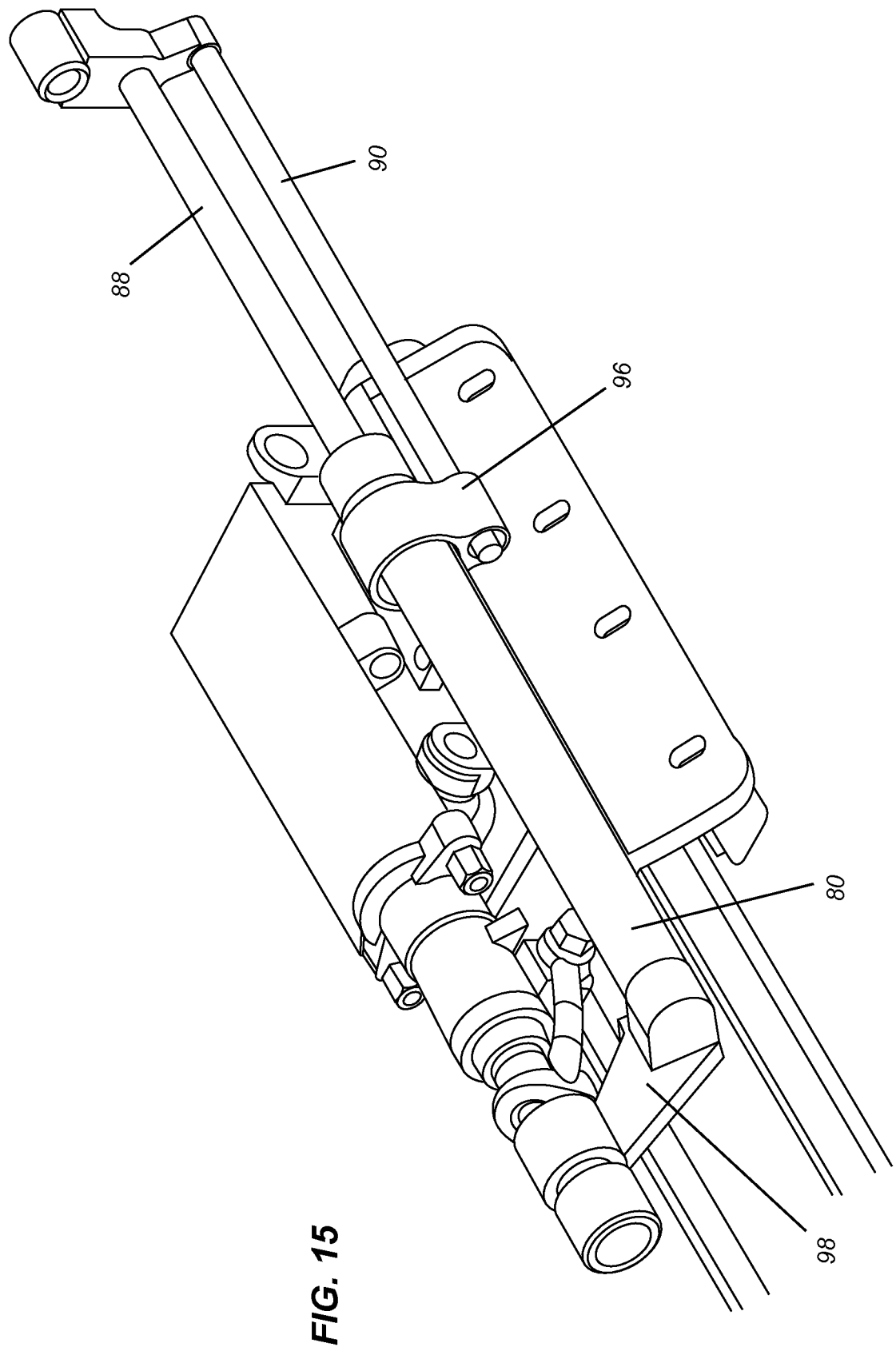
FIG. 15 is a front perspective view of the bolt driver in its extended posture.
Figure 16:
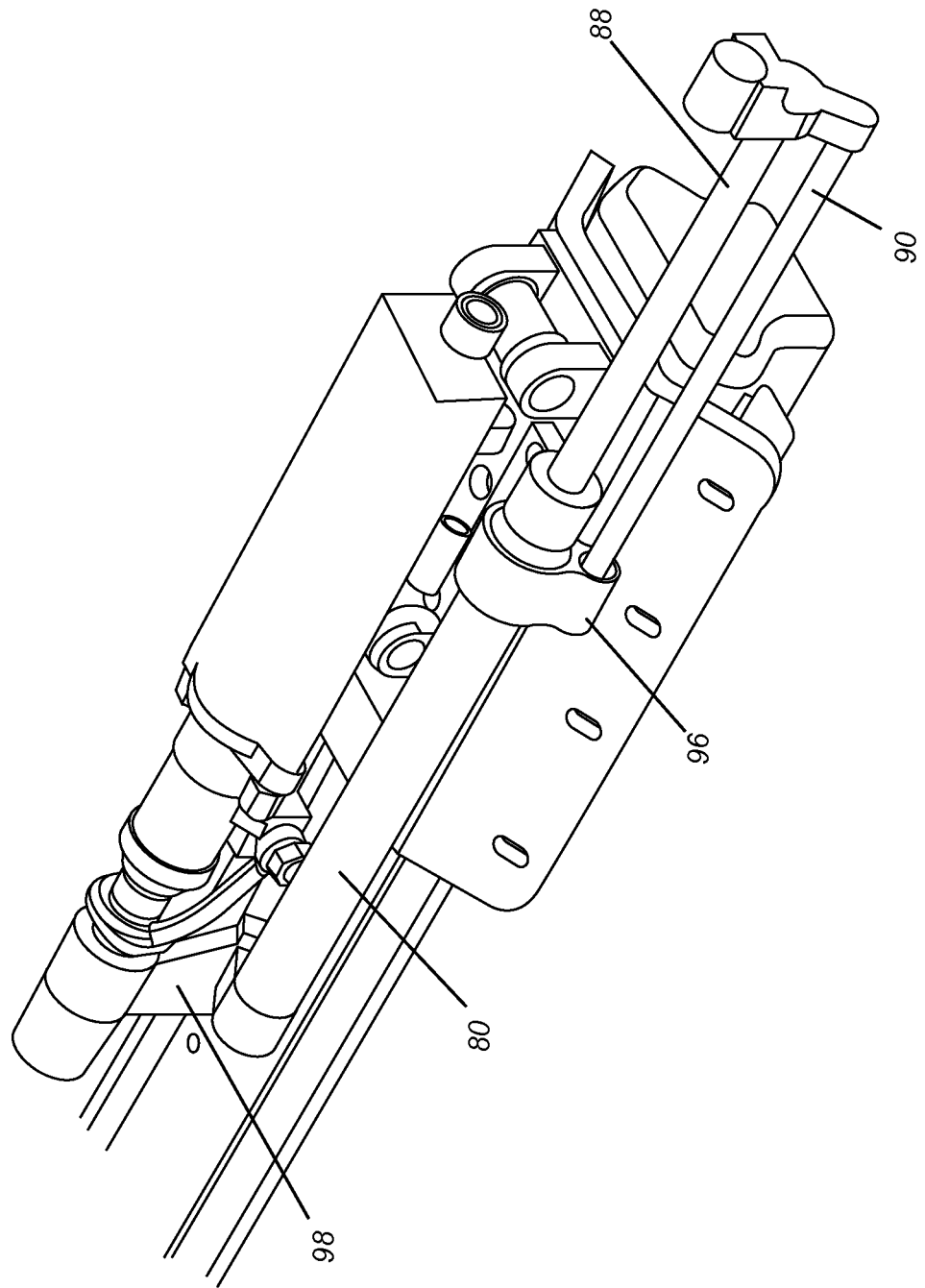
FIG. 16 is a rear perspective view of the bolt driver in its extended posture.

FIGS. 13 and 14 are front and rear perspective views of the bolt driver of FIG. 12 in its retracted posture. FIGS. 15 and 16 are front and rear perspective views of the bolt driver in its extended posture.

Figure 17:
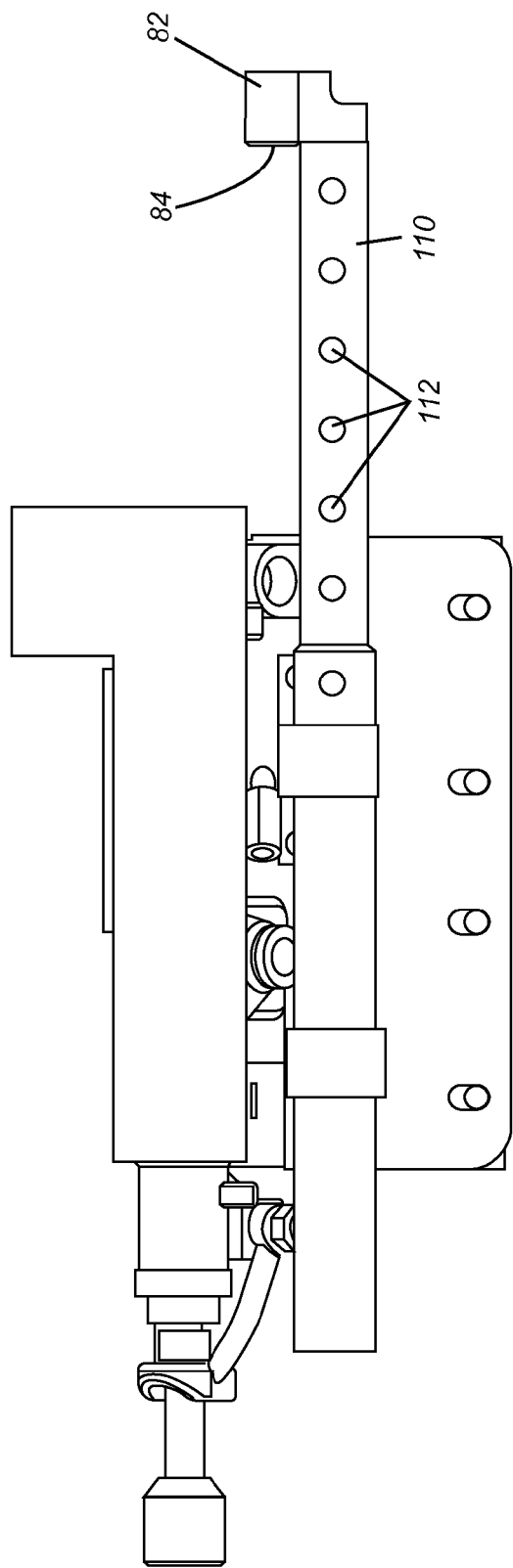
FIG. 17 is a side view of a manually adjustable bolt driver in accordance with a fifth embodiment.

FIG. 17 is a side view of a manually adjustable bolt driver in accordance with a fifth embodiment. In this embodiment, the bolt driver is manually adjustable. Manual adjustment may be provided by an extension member 110 having a plurality of equally spaced holes or bore for receiving a locking pin, bolt or any equivalent locking mechanism. The holder 82 and its socket 84 can thus be manually adjusted to accommodate a rock bolt in a tight space.

The present invention has been described in terms of specific embodiments, examples, implementations and configurations which are intended to be exemplary or illustrative only. Other variants, modifications, refinements and applications of this innovative technology will become readily apparent to those of ordinary skill in the art who have had the benefit of reading this disclosure. Such variants, modifications, refinements and applications fall within the ambit and scope of the present invention. Accordingly, the scope of the exclusive right sought by the Applicant for the present invention is intended to be limited solely by the appended claims and their legal equivalents.

The invention claimed is:

1. A rock drilling and bolting system comprising:
    a frame supporting a movable drill feed rail and a movable bolter feed rail;
    a drill feed slidable on the drill feed rail for drilling a hole;
    a bolter feed slidable on the bolter feed rail, the bolter feed having a main bolt driver for driving a rock bolt;
    a side-mounted bolt driver mounted to the bolter feed, the side-mounted bolt driver being disposed rearwardly of the main bolt driver to receive the rock bolt when there is insufficient space to load the rock bolt in the main bolt driver and to drive the rock bolt partially into the hole; and
    wherein the main bolt driver is rotatable into alignment with the rock bolt that is partially driven into the hole, wherein the main bolt driver drives the rock bolt fully into the hole.

2. The system as claimed in claim 1 wherein the side-mounted bolt driver comprises:
    an attachment collar for attaching to the main bolt driver such that a striking bar percussively transmits forces to the side-mounted bolt driver; and
    an angled arm extending rearwardly and outwardly from the collar;
    a socket parallel to the main bolt driver for receiving a rear end of the rock bolt, the socket extending rearwardly from the angled arm.

3. The system as claimed in claim 2 wherein the attachment collar of the side-mounted bolt driver abuts, and receives percussive forces from, a connecting collar that connects the main bolt driver to the striking bar.

4. The system as claimed in claim 3 further comprising a swing arm centralizer adapted to pivot when the main bolt driver rotates into alignment with the rock bolt.

5. The system as claimed in claim 4 wherein the swing arm centralizer comprises:
    a first arm mounted to the bolter feed rail;
    a second arm pivotally connected to the first arm; and
    a third arm pivotally connected to the second arm, the third arm comprising a passageway for slidably receiving and centralizing the rock bolt.

6. The system as claimed in claim 4 further comprising:
    a first L-shaped pivot arm pivotally connecting the drill feed rail and the bolter feed rail;
    a second L-shaped pivot arm pivotally connecting the drill feed rail and the bolter feed rail;
    wherein the bolter feed rail is rotationally coupled to the drill feed rail by the first and second pivot L-shaped pivot arms to enable the drill feed rail and the bolter feed rail to rotate in unison between a drilling position and a bolting position.

7. The system as claimed in claim 1 further comprising a swing arm centralizer adapted to pivot when the main bolt driver rotates into alignment with the rock bolt.

8. The system as claimed in claim 1 further comprising:
   a first L-shaped pivot arm pivotally connecting the drill feed rail and the bolter feed rail;
   a second L-shaped pivot arm pivotally connecting the drill feed rail and the bolter feed rail;
   wherein the bolter feed rail is rotationally coupled to the drill feed rail by the first and second pivot L-shaped pivot arms to enable the drill feed rail and the bolter feed rail to rotate in unison between a drilling position and a bolting position.

9. A method of installing ground support using a rock drilling and bolting system having a drill feed rail and a bolter feed rail, the method comprising:
   drilling a hole in a rock;
   retracting the drill feed rail while advancing the bolter feed rail to position the system in a bolt-loading position;
   loading a rock bolt into a side-mounted bolt driver that is spaced further rearward from the rock than a main bolt driver;
   driving the rock bolt partially into the hole using the side-mounted bolt driver;
   indexing the main bolt driver into alignment with the rock bolt; and
   driving the rock bolt fully into the hole using the main bolt driver.

10. The method as claimed in claim 9 wherein retracting the drill feed rail while advancing the bolter feed rail to position the system in the bolt-loading position comprises rotating the drill feed rail and the bolter feed rail in unison using a pair of L-shaped pivot arms that pivotally connect the drill feed rail and the bolter feed rail.

11. The method as claimed in claim 9 further comprising pivoting a swing arm centralizer during the indexing of the main bolt driver.

12. The method as claimed in claim 11 wherein pivoting the swing arm centralizer comprises:
   pivoting a second arm connected to a first arm that is mounted to the bolter feed rail to cause a third arm pivotally connected to the second arm and comprising a passageway for slidably receiving and centralizing the rock bolt to move into alignment with the main bolt driver.

13. The method as claimed in claim 9 wherein driving the rock bolt partially into the hole using the side-mounted bolt driver comprises:
   percussively transmitting forces from a striking bar to the side-mounted bolt driver via an attachment collar attached to the main bolt driver, an angled arm extending rearwardly and outwardly from the collar and a socket parallel to the main bolt driver that pushes on a rear end of the rock bolt.

14. A rock drilling and bolting system comprising:
   a frame supporting a movable drill feed rail and a movable bolter feed rail that are connected together via first and second L-shaped pivot arms such that the drill feed rail and bolter feed rail rotate together relative to the frame;
   a drill feed slidable on the drill feed rail for drilling a hole in a rock;
   a bolter feed slidable on the bolter feed rail, the bolter feed having a main bolt driver for driving a rock bolt;
   a side-mounted bolt driver mounted to the bolter feed, the side-mounted bolt driver being disposed rearwardly of the main bolt driver such that the side-mounted bolt driver is further from the rock than the main bolt driver; and
   wherein the main bolt driver is rotatable into alignment with the rock bolt after the side-mounted bolt driver has partially driven the rock bolt into the hole, wherein the bolter feed causes the main bolt driver to drive the rock bolt completely into the hole.

15. The system as claimed in claim 14 further comprising a swing arm centralizer that folds during indexing while slidably holding the rock bolt when the main bolt driver rotates into alignment with the rock bolt.

16. The system as claimed in claim 15 wherein the side-mounted bolt driver comprises:
   an attachment collar for attaching to the main bolt driver such that a striking bar percussively transmits forces to the side-mounted bolt driver; and
   an angled arm extending rearwardly and outwardly from the collar;
   a socket parallel to the main bolt driver for receiving a rear end of the rock bolt, the socket extending rearwardly from the angled arm.

17. The system as claimed in claim 16 wherein the attachment collar of the side-mounted bolt driver abuts, and receives percussive forces from, a connecting collar that connects the main bolt driver to the striking bar.

\* \* \* \* \*